3,041,062
HYDROPNEUMATIC SUSPENSION
Charles V. Bliven, Belleville, Mich., assignor to Ford Motor Company, Dearborn, Mich., a corporation of Delaware
Filed June 30, 1960, Ser. No. 39,961
5 Claims. (Cl. 267—64)

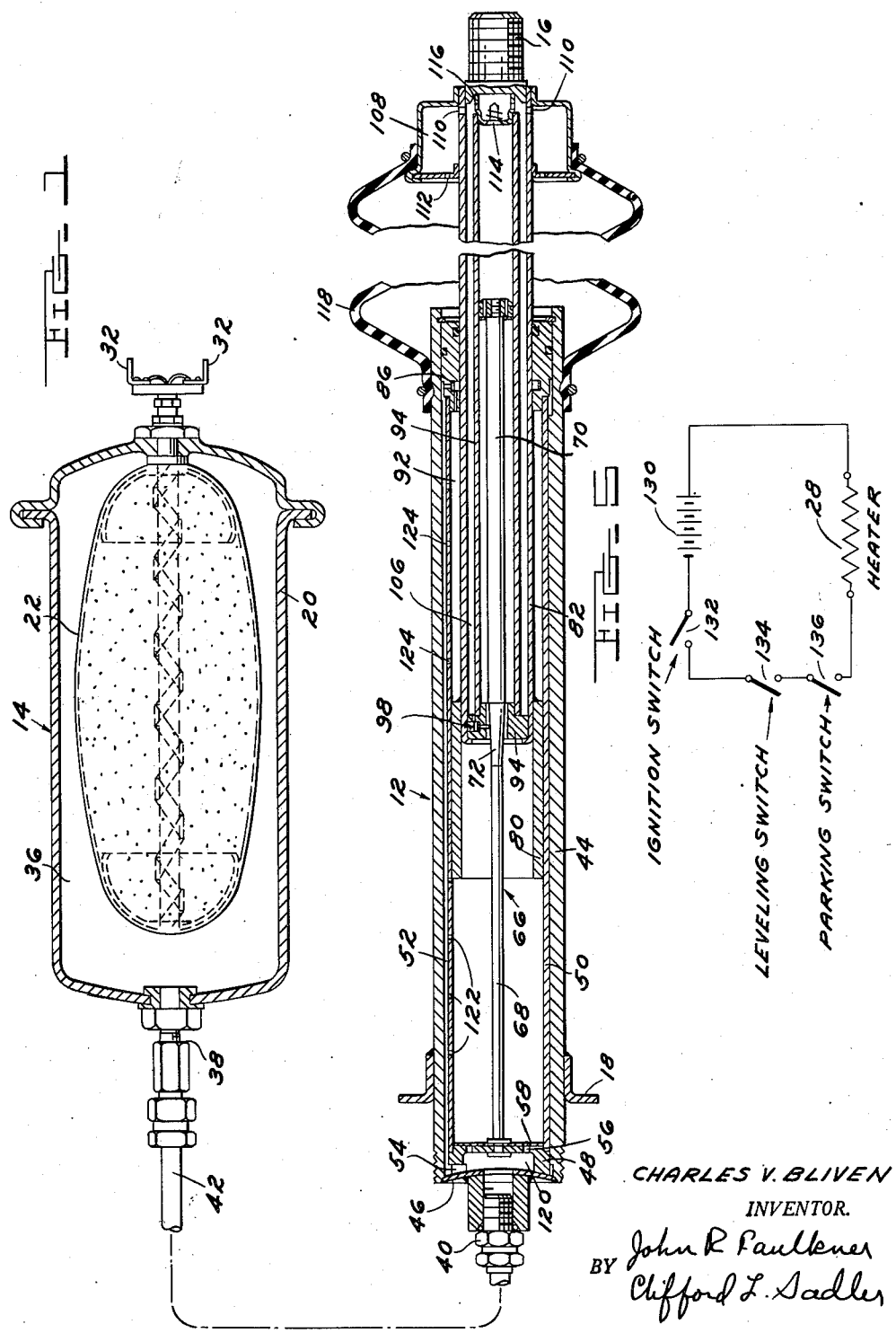

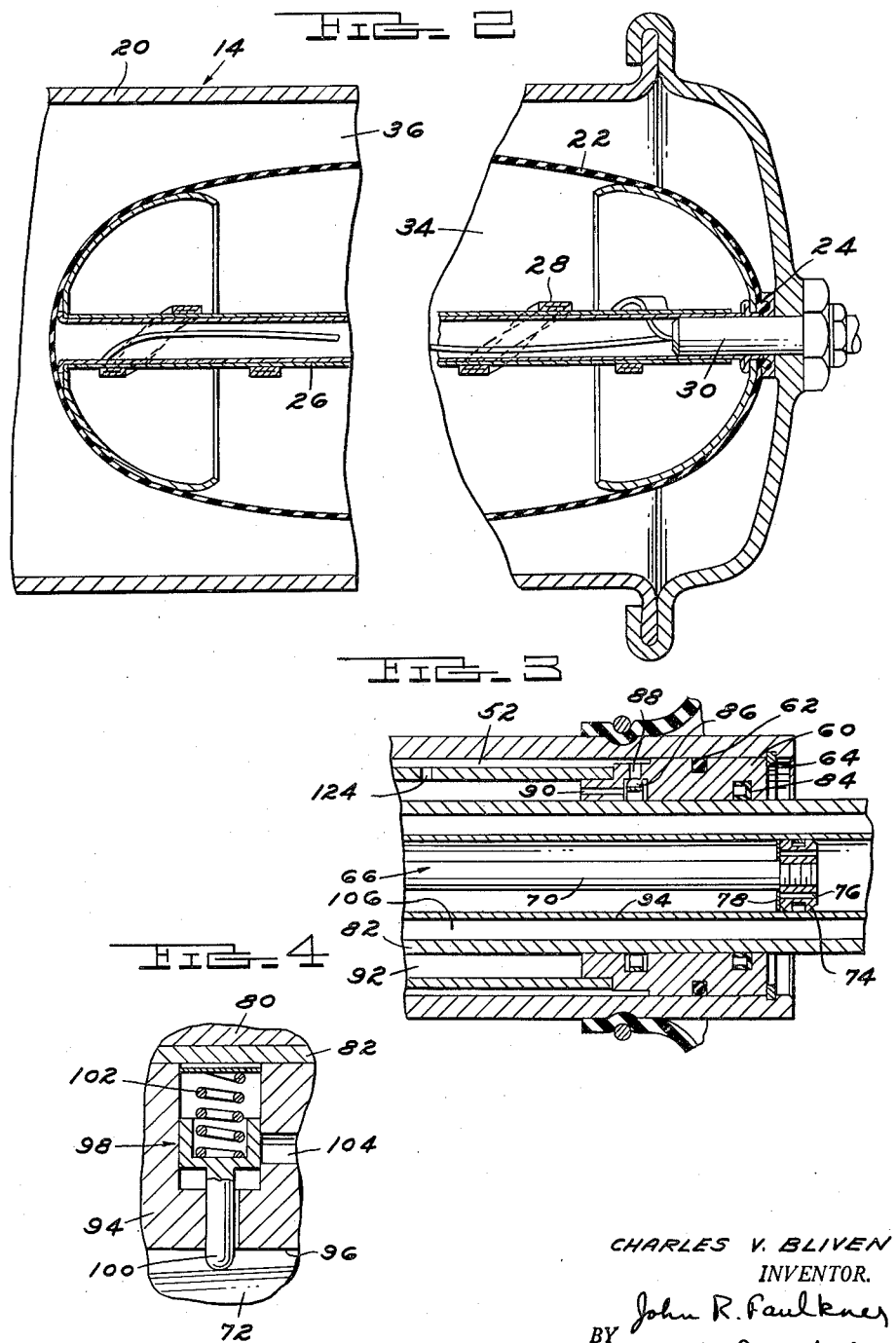

The present invention relates to vehicle suspension systems and more particularly to a hydropneumatic suspension device.

It is common practice in motor vehicle design to provide suspension springs and shock absorbing dampeners interposed between a vehicle's wheel supporting structure and its body. In more sophisticated suspension systems, means for sensing the height of the vehicle are provided in association with controllable auxiliary springing in order to maintain the vehicle body at its designed height under varying load conditions. These suspension components are usually independent units.

This invention provides in a single unit a suspension spring, a shock absorber, and means for both static and dynamic height adjustment or leveling. More specifically, the preferred embodiment of the invention takes the form of a so-called hydropneumatic strut that incorporates a telescopic shock absorber and a pumping device concentric within the shock absorber for dynamic leveling. A gas bag is located in a pressurized hydraulic fluid accumulator for the strut and serves as the elastic element of the suspension system. A heating element is situated within the gas bag for controlled expansion of the gas to effect a static leveling function to compensate for load changes.

It is the principal object of the present invention to provide a suspension device incorporating the functions of a suspension spring, shock absorber, and load levelizer in a single unit.

It is another object of the present invention to provide a shock absorber having a pumping device concentric within the shock absorber for dynamic load compensation.

It is a further object of this invention to have a heating element incorporated in the gas bag of a hydropneumatic strut that is controllable for static load leveling.

These and further objects of the present invention will be more clearly understood from the following description and the accompanying drawings, in which:

FIGURE 1 is a sectional view in elevation of the hydropneumatic suspension device, FIGURE 2 is an enlarged view in section of the accumulator of FIGURE 1, FIGURE 3 is an enlarged sectional view of a portion of the strut of FIGURE 1, FIGURE 4 is an enlarged view of the leveling valve, and FIGURE 5 is a schematic view of the electrical circuit controlling the resistance element in the accumulator.

Referring now to the drawings, wherein like reference numerals identify like parts throughout the various views, a hydropneumatic suspension device constructed in accordance with the present invention is disclosed. The device includes an accumulator 14 and a telescopic strut 12 that is interposed between sprung and unsprung vehicle components.

The telescopic strut 12 has a threaded lower end 16 for connection to an unsprung member such as an upper support arm of an independent front suspension. The upper end of the strut is provided with a flange 18 for mounting on the vehicle body.

The strut 12 is filled with hydraulic fluid, portions of which are maintained under pressure by the accumulator 14. The accumulator 14 includes a sealed can-like housing 20. A rubber bag member 22 is located within the can 20 and secured to the top thereof at 24. A tubular member 26 extends the length of the axis of the bag 22. An electrical resistance element 28 is wound about the tube 26 and has its leads passing through a sealed fitting 30 to exterior terminal posts 32.

The chamber 34 within the bag 22 is filled with an inert gas under pressure. The accumulator volume 36 between the can 20 and the bag 22 contains hydraulic fluid. When the resistance element 28 is heated by applying an electrical potential across the terminal posts 32, the gas contained at 34 is also heated and expanded. The expansion of the gas within the bag 22 will further pressurize the fluid contained in the accumulator volume 36.

A pipe fitting 38 communicates with the bottom portion of the can 20 and a similar fitting 40 is connected to the top of the strut 12. The two fittings 38, 40 are connected by a hydraulic line 42. These elements permit the communication of hydraulic fluid from the accumulator 14 to the strut 12 under greater or less pressure as determined in part by the condition of the gas in the bag 22.

The strut 12 contains a series of concentric telescopic elements that cooperate to function as a shock absorber and load levelizer. The strut 12 includes an outer cylinder 44 having a top closure member 46 to which the fitting 40 is secured. A compression valve cage 48 is secured adjacent the top 46 of the cylinder 44. A pressure tube 50 is positioned within the cylinder 44 and butted against the valve cage 48. A longitudinal passageway 52 is provided between one side of the pressure tube 50 and the cylinder 44. A radial passage 54 in the valve cage 48 joins the area above the cage 48 with the passageway 52.

A series of circumferentially spaced apart axial openings 56 are provided in the compression valve cage 48 for communication between the interior of the pressure tube 50 and the accumulator 14. These openings 56 are sealed by a compression check valve 58 that is formed of thin sheet metal. The lower end of the pressure tube 50 is sealed by an annular member 60 that is fitted in the tube 44. An O-ring 62 prevents the leakage of fluid between the wall of the cylinder 44 and the annular member 60. A snap ring 64 maintains the members in position.

A pump rod 66 has its upper end affixed to the center of the compression valve cage 48 and extends downwardly along the axis of the pressure tube 50. It is to be noted that the upper end 68 of the rod 66 is thinner than the lower end 70 and that these portions are connected by an intermediate taper 72. A pump piston 74 is threaded on the end of the pump rod 70 and has axial passages 76. A flapper valve element 78 functions as a check valve to seal the passages 76.

An annular shock absorber piston 80 is slidably received within the pressure tube 50 and is welded to a tubular piston rod 82. The rod 82 has a sliding fit with the annular element 60. A seal 84 prevents the leakage of fluid therebetween. A spring-pressed check valve 86 is located in the annular ring 60. Check valve 86 is interposed between a pair of passages 88 and 90 that join longitudinal passageway 52 and the annular chamber 92 situated beneath the shock absorber piston 80 and between the piston rod 82 and pressure tube 50. Check valve 86 permits fluid flow only in the direction from the passageway 52 to the chamber 92.

A pump tube 94 is concentrically situated within the shock absorber piston rod 82. An annular element 94 joins the upper end of the piston rod 82 and the pump tube 94 in sealed engagement. The axial bore 96 of the element 94 is dimensioned to be slightly larger than the enlarged lower end 70 of the pump rod 66.

A leveling valve is situated within the element 94 and includes a valve element 98 having a pin-like protruding member 100 that engages the pump rod 66. Valve element 98 is urged by a spring 102 into such engagement. The body portion of the valve element 98 seals an axial passageway 104 that connects the annular space 106 between the pump tube 94 and the shocker absorber piston rod 82. When the strut 12 is contracted or compressed and the protruding pin 100 of valve element 98 is pressed outwardly by engagement with the enlarged lower end 70 of the pump rod 66 a controlled flow will be permitted through the clearance around the pin 100 and through passageway 104.

An annular reservoir 108 is secured to the end 16 of the strut 12. The lower end of the piston rod 82 forms the inner wall of the reservoir 108. Radial passageways 110 join the reservoir with the area 106 between the tubular rod 82 and pump tube 94. The reservoir 108 is vented by an opening 112 so that the fluid contained therein is at ambient pressure. A spring-pressed check valve 114 seals the lower end of the pump tube 94. The tube 94 has passageway 116 for communication of fluid between the lower side of the check valve 114 and the reservoir 108. A flexible rubber bellows 118 is sealed about the reservoir 108 at one end and about the lower end of the cylinder 44 at its other. The bellows 118 functions as a dust shield to protect the rod 82 and to prevent contaminates from entering the reservoir 108.

Pressure tube 50 is provided with a series of compression orifices 122 along its upper end for limited communication between the passageway 52 and the chamber above the piston 80. Rebound orifices 124 provide in a similar fashion controlled communication between passageway 52 and the annular chamber 92 below the piston 80.

Assuming that the vehicle wheel with which the strut 12 is associated should strike a bump, the unit would telescope or commence a jounce stroke causing the fluid located above the piston 80 to be forced through the compression orifices 122. At the same time pressure will force compression check valve 58 to close the openings 56. Fluid will pass downwardly through the longitudinal passageway 52 and through the orifices 124 to the expanding chamber 92 below the piston 80. Check valve 86 will be opened permitting additional replenishing of fluid to annular chamber 92.

As the volume below the piston 80 is less than the volume above the piston, an amount of hydraulic fluid equal to the displacement of the piston rod 82 will be forced through line 42 to the accumulator 14. This flow of fluid will elastically compress the gas within the bag 22 and cushion further movement of the piston 80. Thus the gas bag 22 functions as a suspension spring. The passage of fluid through the restrictions of orifices 122 and 124 produces the dampening or shock absorbing function.

As long as the compression forces are greater than the spring forces of the gas bag 22 the piston 80 will move upwardly until the last compression orifice 122 is sealed off. As each of the series of orifices 122 is closed by the piston 80 the further passage of fluid becomes increasingly difficult. When the last opening 122 is closed a hydraulic lock is achieved and further movement of the shock absorber piston 80 will be prevented.

During the jounce stroke, check valve 114 sealing the lower end of the pump tube 94 is closed. As the lower end of the strut 12 moves upwardly the fluid located in the tube 94 is forced through the openings 76 of piston 74 and past flapper check valve 78. This will force a volume of fluid upwardly between the rod 66 and opening 96 equal to the displacement of the pump rod 66.

After the strut 12 has completed its jounce stroke the rebound stroke begins. At the start of the rebound stroke, the pressure above the piston 80 is relieved and flapper valve element 58 is opened to replenish the upper chamber which expands when the piston 80 moves downwardly. The annular chamber 92 below the piston 80 is then pressurized and fluid is forced outwardly through rebound orifices 124. The check valve 86 is closed. Hydraulic fluid returns from the accumulator 14 to the strut 12 and the chamber above the piston 80 in an amount equal to the displacement of the piston rod 82.

During the rebound stroke, valve element 78 closes the openings 76 and the fluid contained above the piston 74 within the pump tube 94 is pressurized and forced through the clearance between the rod 66 and the openings 96. This, in effect, pumps fluid to the upper chamber of the strut 12. The cooperation between check valves 78 and 114 causes pumping to occur on both the jounce and rebound strokes.

When the strut extends beyond its midpoint, the pin end 100 of leveling valve element 98 comes into contact with the taper 72 of pump rod 76, which, in turn, opens passageway 104 to the flow of fluid past the cleaarnce around the pin end 100. As the area 106 between the pump tube 94 and piston rod 82 is vented to ambient pressure through the reservoir 108, limited fluid flow will be permitted from the chamber above the piston 80 to the reservoir 108.

The action of the pump and the leveling valve 98 functions as a dynamic leveling device. Assuming that the vehicle has an increased load the strut 12 will be contracted so that the leveling valve 98 will be operating in the narrow region 68 of the pump rod 66. Under such conditions, the valve 98 will be closed so that fluid pumped to the area above the shock absorber piston 80 by the piston 74 will not be permitted to bleed back to the reservoir 108. The pumping of fluid will continue to increase the fluid volume above the piston 80 and extend the strut 12 until the levering valve 98 is again operating in the central region of the rod 66. Conversely, assuming that a portion of the load has been relieved from the vehicle, the strut 12 will become extended and the valve 98 will be opened as the pin end 100 bears against the enlarged lower end 70 of the rod 66. This will permit excess leakage of fluid from above piston 80 back to the reservoir 108. With this dynamic leveling means the taper portion 72 is disposed so that when the strut 12 is reciprocating it will be maintained at the design height and the amount of fluid pumped by piston 74 will be equal to the amount of fluid returned to the reservoir by leveling valve 98. Thus, it is seen that fluid pressure exerted on the area of the rod 82 supports the vehicle.

A static leveling means is provided and includes the electrical resistance element 28. Element 28 is situated in series with an electrical potential source 130, the vehicle's ignition switch 132, a leveling switch 134, and a parking switch 136. All of these switches must be closed to heat element 28. Switch 132 requires the vehicle's ignition circuit be in an "on" position and switch 136 requires that the vehicle's transmission be in a "park" position. Switch 134 is connected to a height sensing unit and is closed whenever the vehicle is below design height.

Assuming that the ignition switch 132 is on and switch 136 is closed with the transmission in a park position, when the vehicle is loaded so as to be less than design height switch 134 will close causing electric current to flow from the source 130 to the element 28. This will heat the element 28 and the gas within the bag 22. The gas will be expanded forcing hydraulic fluid under increased pressure from the accumulator 14 to the chamber above the piston 80 and this, in turn, will extend the strut 12 returning the car to its design height.

A suspension device constructed in accordance with this invention provides an elastic suspension spring, a telescopic shock absorber, static vehicle leveling, and dynamic vehicle leveling in a single unit.

The foregoing description constitutes the preferred embodiment of the present invention. It is contemplated that modifications may occur to fit specific installation situations. The shock hydropneumatic device is intended for independent installation at each of the vehicle's wheels, however, it may be appropriate to have an interconnected system with a single accumulator source feeding each wheel unit. The drawing shows the accumulator as being separate from the strut portion and connected thereto by a hydraulic line, however, it is clear that this structure might have the accumulator secured directly to the strut portion of the device.

Modifications and alternate arrangement may occur to those skilled in the art which will come within the scope and spirit of the following claims.

I claim:

1. A hydropneumatic suspension device for vehicles having an accumulator containing pressurized fluid and a strut having a plurality of concentric telescopic members, said strut comprising a pressure tube and a shock absorber piston reciprocatable within said pressure tube, an axial series of control orifices in the wall of said pressure tube, said orifices having intercommunicating means exterior of said pressure tube, a metering rod concentric within said pressure tube and rigidly positioned relative thereto, said shock absorber piston having a tubular piston rod, a concentric pump tube positioned about said metering rod within said tubular piston rod, said metering rod having a valved pump piston positioned within said pump tube, the annular volume between said tubular piston rod and said pump tube being communicable with an ambient pressure reservoir chamber, said shock absorber piston dividing said pressure tube into a compression chamber portion and rebound chamber portion, leveling valve means carried by said shock absorber piston and responsive in its operation to the relative position of said meter rod and said shock absorber piston, said valve means providing a communicable means between said compression chamber portion and said annular volume, said accumulator being communicable with said compression chamber portion.

2. A suspension device for vehicles having a plurality of concentric telescopic members, said device comprising a pressure tube and a shock absorber piston reciprocatable within said pressure tube, an axial series of control orifices in the wall of said pressure tube, said orifices having intercommunicating means exterior of said pressure tube, a metering rod concentric within said pressure tube and rigidly positioned relative thereto, said shock absorber piston having a tubular piston rod, a concentric pump tube positioned about said metering rod and within said tubular piston rod, said metering rod having a valved pump piston positioned within said pump tube, the annular volume between said tubular piston rod and said pump tube being communicable with an ambient pressure reservoir chamber, said shock absorber piston dividing said pressure tube into a compression chamber portion and a rebound chamber portion, leveling valve means carried by said shock absorber piston rod responsive in its operation to the relative position of said meter rod and said shock absorber piston, said valve means providing a communicable means between said compression chamber portion and said annular volume.

3. A suspension device for vehicles having a plurality of concentric telescopic members, said device comprising a pressure tube and a shock absorber piston reciprocatable within said pressure tube, a metering rod concentric within said pressure tube and rigidly positioned relative thereto, said shock absorber piston having a tubular piston rod, a concentric pump tube positioned about said metering rod and within said tubular piston rod, said metering rod having a valved pump piston positioned within said pump tube, the annular volume between said tubular piston rod and said pump tube being at ambient pressure, said shock absorber piston dividing said pressure tube into a compression chamber portion and a rebound chamber portion, leveling valve means responsive in operation to the relative position of said meter rod and said shock absorber piston, said valve means providing a communicable means between said compression chamber and said annular volume.

4. A hydropneumatic suspension device for vehicles having an accumulator containing pressurized fluid and a strut having a plurality of concentric telescopic members, said strut comprising a pressure tube and a shock absorber piston reciprocatable within said pressure tube, a metering rod concentric within said tube and rigidly positioned relative thereto, said shock absorber piston dividing said pressure tube into a compression chamber portion and rebound chamber portion, leveling valve means associated with said shock absorber piston and responsive in operation to the relative position of said meter rod and said shock absorber piston, said valve means providing a communicable means between said compression chamber portion and an ambient pressure reservoir chamber, said accumulator being communicable with said compression chamber portion.

5. A suspension device for vehicles having a plurality of concentric telescopic members, said device comprising a pressure tube and a shock absorber piston reciprocatable within said tube, a pump rod concentric within said tube and rigidly positioned relative thereto, said shock absorber piston having a tubular supporting piston rod, said pump rod having a valved pump piston operatively positioned within said tubular piston rod, a reservoir chamber maintained at an ambient pressure, said shock absorber piston dividing said pressure tube into a compression chamber portion and a rebound chamber portion, means providing communication between said compression chamber portion and said reservoir, an axial series of control orifices in the wall of said pressure tube, said orifices having passage-way means exterior of said pressure tube providing communication between said chamber portions.

References Cited in the file of this patent

UNITED STATES PATENTS

| | | |
|---|---|---|
| 2,802,664 | Jackson | Aug. 13, 1957 |
| 2,887,324 | Jackson | May 19, 1959 |
| 2,949,315 | Taylor | Aug. 16, 1960 |